United States Patent

[11] 3,632,207

| [72] | Inventor | Reinhold Wachter<br>Heepen uber Bielefeld, Germany |
|---|---|---|
| [21] | Appl. No. | 804,897 |
| [22] | Filed | Mar. 6, 1969 |
| [45] | Patented | Jan. 4, 1972 |
| [73] | Assignee | Bio Bielefelder Offsetdruckplatten Und<br>Zubehor B. Krause<br>Jollenbeck am Westf., Germany |
| [32] | Priority | Mar. 6, 1968 |
| [33] | | Germany |
| [31] | | B 17 107/57 |

[54] APPARATUS FOR IMAGE TRANSFER
4 Claims, 2 Drawing Figs.

[52] U.S. Cl. .................................................. 355/85
[51] Int. Cl. .............................................. G03b 27/04
[50] Field of Search .......................................... 355/85, 119

[56] References Cited
FOREIGN PATENTS
508,134  3/1925  Germany ..................... 355/85

Primary Examiner—John M. Horan
Assistant Examiner—Russell E. Adams, Jr.
Attorney—Michael S. Striker

ABSTRACT: Apparatus for transferring images to carriers, particularly to offset printing plates, comprises a hollow reflector which is provided with internal light-reflecting surfaces and is interposed between the light source and the transparency on top of the sensitized plate. The reflecting surfaces diffuse the light, so that upon exposure of the plate shadows from the edges of the transparency and from the adhesive tape holding it on the plate are eliminated.

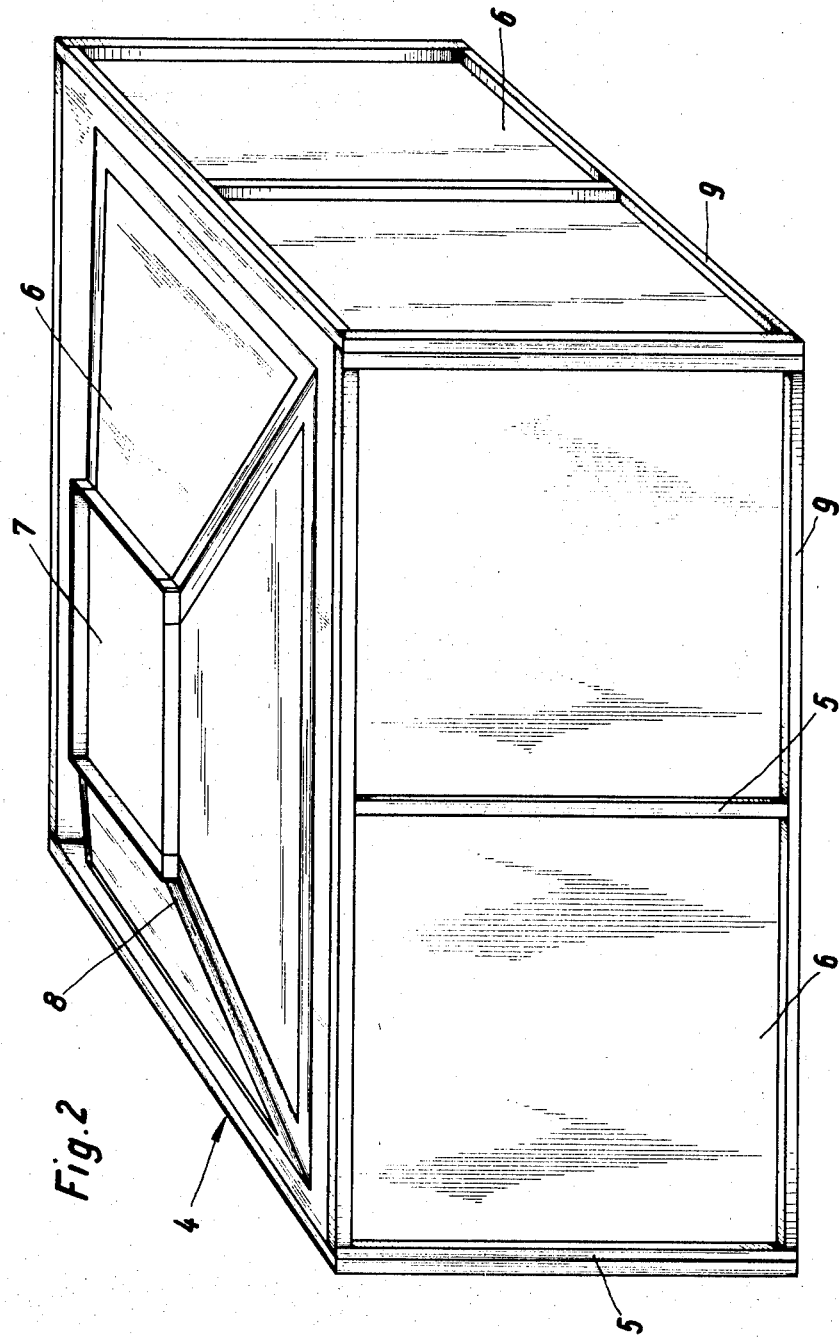

3,632,207

APPARATUS FOR IMAGE TRANSFER

BACKGROUND OF THE INVENTION

The present invention relates to an apparatus for transferring images to carriers, and particularly to offset printing plates.

In the conventional method of photographic printing the transparency in contact with the sensitized carrier is exposed to light whereby the image of the transparency is transferred to the plate. To obtain an image of the desired sharp definition, the transparency is held on or between sheets of transparent material and affixed thereto by transparent adhesive tape.

This method has the disadvantage that after exposure the edges of the transparency and of the adhesive tape show up as streaks on the transferred image. Before prints can be made from plates so exposed, the streaks must be removed. Retouching or refinishing the plates with an etchproof medium is a difficult and time-consuming operation which absorbs about 50 percent of the total time allotted for finishing a plate. To remove the flaws takes a great deal of concentration and skill; even if a skilled worker spends on the average 2 or 3 hours per plate he is not always able to remove all the imperfections.

SUMMARY OF THE INVENTION

It is an object of the present invention to provide a simple arrangement whereby images can be transferred to offset printing plates without the shadows produced by the edges of the transparency or of the adhesive tape with which it is held in place.

Another object of the invention is to provide an arrangement which can be easily installed in existing apparatus.

A further object of the invention is to save time and labor in refinishing the transferred image.

These objects are attained by interposing, between the light source and the printing frame holding the plate and the transparency, a hollow reflector with internal light-reflecting surfaces for confining the light and directing it onto the frame. The diffused light reflected from the surfaces strikes the transparency and the adhesive tape holding it in position at an angle which prevents reproduction of the edges as streaks on the image transferred onto the plate. The arrangement reduces the time required for finishing a plate by about 50 percent. It also reduces the exposure time by about one-third, since the intensity of the concentrated light is much greater than in conventional apparatus. Furthermore, the uniformity of illumination is greatly improved by diffusing the light before it impinges against the printing frame.

The reflector can easily be installed in conventional printing arrangements. Means are provided to move it toward and away from the light source as well as the printing frame.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is an enlarged perspective view of the reflector.

DESCRIPTION OF THE PREFERRED EMBODIMENTS

Figure 1:
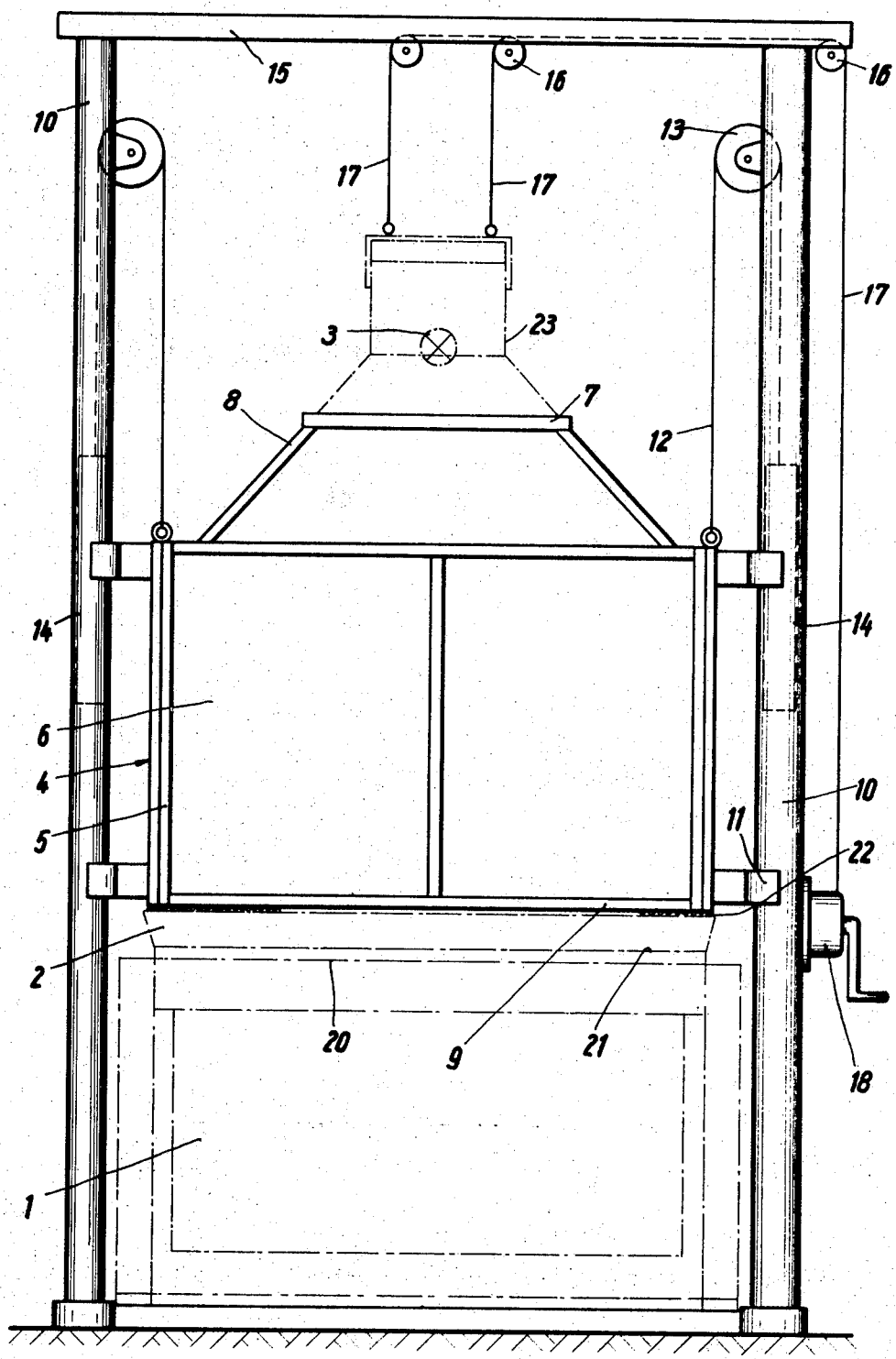
FIG. 1 is a schematic side elevational view of an arrangement which embodies the invention.

In FIG. 1 there is shown a printing frame 1 supporting an offset printing plate 20. A cover 2 including a sheet of glass 21 lies on top of the printing frame 1 and can be moved vertically and pivoted by conventional means. The light source comprising a copying lamp 3 in a housing 23 is suspended above the cover 2. A reflector 4, having the shape of a hollow rectangular box, is mounted between the lamp housing 23 and the frame 1. Its steel frame 5 supports walls 6 which, according to one embodiment of the invention, are made from hammered aluminum. The uneven surface of such walls is particularly adapted to diffuse any light falling on it. The edge 9 at the lower end of the hollow reflector 4 adjoins the edge 22 of the cover 2. At its upper end, remote from the edge 9, the reflector has a frustoconical extension 8, tapering off toward a central aperture 7 which is dimensioned to accommodate the lower part of the lamp housing 23 whereby an even more favorable concentration of light is obtained.

Hollow guides 10 on each side of the frame 1 are engageable by runners 11 attached on the exterior of the reflector 4. Cables 12 are symmetrically attached to the top portion of the reflector 4 and are trained over pulleys 13 which are rotatably mounted on the guides 10. Each cable 12 extends into the interior of the respective guide. The ends of cables 12, remote from the points of their attachment to the reflector 4, are connected to movable counterweights 14. The weight of each of the two counterweights 14 shown in the embodiment of FIG. 1 is equivalent to one-half of the reflector weight, so that the latter can be easily raised or lowered by hand. The weight distribution is such that even at its highest elevation the reflector requires no additional holding means.

A transverse support or crosshead 15 mounted on top of the guides 10 reinforces the structure of the arrangement and carries a plurality of rotatable pulleys 16. The lamp housing 23 is suspended on cables 17 which lead over the pulleys 16 to a small winch 18 mounted on one of the lateral guides 10 and which can be manipulated to move the lamp housing up or down.

It will be understood that each of the elements described above, or two or more together, may also find a useful application in other types of apparatus for transferring images differing from the types described above.

While the invention has been illustrated and described as embodied in apparatus for transferring images to offset printing plates, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended

1. Apparatus for transferring images to offset printing plates, comprising support means for supporting an offset printing plate in horizontal position; a light source arranged above said support means and comprising a lamp housing having an opened lower end and a lamp in said housing; hollow reflector means having internal reflecting surfaces interposed between said light source and said support means to form a passageway for the transmission of light from said source toward said support means and for reflecting part of the light emanating from said source at an acute angle toward said support means, said reflector means comprising a lower portion of polygonal outline and a frustoconical upper portion tapering toward said light source and having an open upper end registering with said open lower end of said housing; and means for moving said light source and said reflector means in vertical direction relative to each other and said support means.

2. Apparatus as defined in claim 1, wherein said surfaces are made of hammered aluminum.

3. Apparatus as defined in claim 1, wherein said means for moving said light source in vertical directions comprise a transverse support, a plurality of cables attached to said light source, and pulleys provided on said support for said cables.

4. Apparatus as defined in claim 1, wherein said means for moving said reflector means in vertical directions comprise a plurality of cables, each of said cables being attached at one end to said reflector means, a counterweight attached to the opposite end of each of said cables, pulleys for said cables, and hollow guides enclosing portions of said cables.

* * * * *